(12) United States Patent
Nikopour-Deilami et al.

(10) Patent No.: US 7,986,752 B2
(45) Date of Patent: Jul. 26, 2011

(54) PARALLEL SOFT SPHERICAL MIMO RECEIVER AND DECODING METHOD

(75) Inventors: Hosein Nikopour-Deilami, Ottawa (CA); Amir Keyvan Khandani, Kitchener (CA); Aladdin Saleh, Mississauga (CA)

(73) Assignees: BCE Inc., Montreal (CA); University of Waterloo, Waterloo (CA)

( * ) Notice: Subject to any disclaimer, the term of this patent is extended or adjusted under 35 U.S.C. 154(b) by 1063 days.

(21) Appl. No.: 11/694,186

(22) Filed: Mar. 30, 2007

(65) Prior Publication Data

US 2007/0286313 A1      Dec. 13, 2007

(30) Foreign Application Priority Data

Mar. 31, 2006   (CA) ...................................... 2541567

(51) Int. Cl.
  *H04L 27/06* (2006.01)
  *H03M 13/03* (2006.01)
(52) U.S. Cl. ........................ 375/341; 714/790; 714/796
(58) Field of Classification Search .......... 375/135–136, 375/262, 267, 295, 316, 260–261, 265, 324, 375/340, 341, E7.016; 370/320, 334–335, 370/342; 455/33.3, 91, 101, 130, 132, 562.1; 714/794–796, 790
See application file for complete search history.

(56) References Cited

U.S. PATENT DOCUMENTS

| | | | |
|---|---|---|---|
| 7,236,536 B2* | 6/2007 | Hochwald et al. | 375/265 |
| 7,251,768 B2* | 7/2007 | Giannakis et al. | 714/755 |
| 7,424,063 B2* | 9/2008 | Yee | 375/267 |
| 2003/0185310 A1* | 10/2003 | Ketchum et al. | 375/259 |
| 2004/0174939 A1 | 9/2004 | Wang | |
| 2005/0050072 A1* | 3/2005 | Widdup et al. | 707/100 |
| 2005/0111592 A1* | 5/2005 | Yee | 375/341 |
| 2005/0128936 A1* | 6/2005 | Shao | 370/208 |
| 2005/0135498 A1* | 6/2005 | Yee | 375/267 |
| 2005/0157811 A1 | 7/2005 | Bjerke et al. | |
| 2005/0210029 A1* | 9/2005 | Adachi | 707/9 |
| 2005/0271166 A1 | 12/2005 | Love et al. | |
| 2006/0018410 A1* | 1/2006 | Onggosanusi et al. | 375/340 |
| 2006/0146965 A1* | 7/2006 | Kwun et al. | 375/341 |
| 2007/0116143 A1* | 5/2007 | Bjerke et al. | 375/262 |
| 2008/0137763 A1* | 6/2008 | Waters et al. | 375/260 |
| 2008/0144746 A1* | 6/2008 | Waters et al. | 375/340 |
| 2010/0014606 A1* | 1/2010 | Chen et al. | 375/262 |

OTHER PUBLICATIONS

Boutros et al., Soft-input soft-output lattice sphere decoder for linear channels, 2003, Global Telecommunications Conference, 2003. Globecom' 03. IEEE, vol. 3, pp. 1583-1587.*

(Continued)

*Primary Examiner* — Tesfaldet Bocure
*Assistant Examiner* — Lawrence B Williams
(74) *Attorney, Agent, or Firm* — Leslie A. Kinsman; Border Ladner Gervais LLP

(57) ABSTRACT

A method and system for detecting and decoding multiple signals. A low-complexity MIMO detector that combines sphere decoding and m-algorithm approaches, while accounting for the effect of channel condition on the decoding operation, is provided. Taking into account the channel condition effectively controls the size of the search tree, and consequently the search complexity, in an adaptive manner. The channel condition is exploited in the construction of the tree to manage the number of branches in the tree and to avoid undesirable growth.

49 Claims, 9 Drawing Sheets

OTHER PUBLICATIONS

Nikpour, H., et al, Parallel Soft Spherical Detection for Coded MIMO Systems, 2006, Wireless Communications and Networking Conference, 2006. WCNC 2006. IEEE, pp. 1776-1781.*

Boutros et al., Soft-Input Soft Ouptut Lattice Sphere Decoder for Linear Channels, 2003, Global Telecommunications Conference, 2003. Globecom '03. IEEE, 2003, vol. 3, pp. 1583-1587.*

Widdup et al., A Highly-Parallel VLSI Architecture For A List Sphere Detector, 2004, Communications, 2004 IEEE International Conference on, vol. 5, pp. 2720-2725.*

Anxin et al., A Faster ML Sphere Decoder With Competing Branches, 2005, Vehicular Technology Conference, 2005. VTC 2005-Spring. 2005 IEEE 61st, vol. 1, pp. 438-441.*

Chen et al., A New Family of Unitary Space-Time Codes With A Fast Parallel Spere Decoder Algorithm, 2006, Information Theory, IEEE Transactions on, vol. 52, pp. 115-140.*

Chan et al., A New Reduced-Complexity Sphere Decoder For Multiple Antenna Systems, 2002, Communications, 2002. ICC 2002. IEEE International Conference on, vol. 1, pp. 460-464.*

Thian et al., A Reduced-Complexity MIMO Receiver Via Channel Ordering, 2009, Global Telecommunications Conference, 2009. GLOBECOM 2009. IEEE, pp. 1-6.*

Boutros et al., "Soft-Input Soft-Output Lattice Sphere Decoder for Linear Channels", Proc. of IEEE Global Telecommun. Conf., GLOBECOM 03, Anchorage, AK, May 2003, pp. 2653-2657.

Nikopour et al., "Parallel Soft Spherical Detection for Coded MIMO Systems", pp. 1-17, Wireless Communications and Networking Conference, 2006.

Kind et al., "Efficient List Decoding for Lattices", Australian Communication Theory Workshop Proceedings, 2003, pp. 1-5.

* cited by examiner

PARALLEL SOFT SPHERICAL MIMO RECEIVER AND DECODING METHOD

FIELD OF THE INVENTION

The present invention relates generally to wireless communications. More particularly, the present invention relates to multiple-input multiple-output (MIMO) receivers and decoding methods.

BACKGROUND OF THE INVENTION

The increasing demand for high-speed wireless data and voice transmission requires system designers to achieve ever higher throughput in radio channels with limited bandwidth. Recently, there has been considerable interest in using multiple transmit and receive antennas, because of their ability to offer a high data rate over fading channels. Generally, the capacity of a MIMO channel increases linearly according to the minimum number of transmit and receive antennas without requiring increased bandwidth or transmitted power. The Bell-Lab layered space-time (BLAST) architecture is an example of current uncoded MIMO systems. Because of their high spectrum efficiency, MIMO techniques have been incorporated into several wireless standards, including the recently published IEEE 802.16 standard.

MIMO systems also permit spatial user multiplexing (also known as Space Division Multiple Access (SDMA)). In the uplink SDMA, multiple user signals are multiplexed in the uplink. For example, the IEEE 802.16e (Mobile Worldwide Interoperability for Microwave Access (WiMAX)) standard includes provisions for spatial user multiplexing. However, the standard does not specify the receiver structure. At this point, no method has been suggested for separating users multiplexed over multiple transmit antennas.

In decoding a MIMO channel, lattice decoding methods can be used for detection, since the received signal set has a regular structure. However, the complexity of the optimum lattice decoding grows exponentially with the number of transmit antennas, and with the constellation size. Several sub-optimum MIMO detectors have been proposed based on nulling and interference cancellation (IC), which essentially perform zero-forcing or minimum-mean-square-error equalization. The performance of these simple detection schemes is significantly inferior to that of a maximum likelihood (ML) detector. However, the complexity of ML detectors grow exponentially according to the number of transmit antennas.

Sphere decoding is a hard detection method that can be used in MIMO systems with near ML performance. In sphere decoding, the lattice points inside a hyper-sphere are checked and the closest lattice point is determined. It is known that even the average complexity of the sphere decoding algorithm is exponential.

The optimum capacity of coded MIMO systems is achieved by using an outer channel coder concatenated with a space-time mapper acting like an inner code. Iterative a posteriori probability (APP) detection techniques, such as iterative joint detection and decoding with soft inputs and outputs can be used for decoding of such systems. In contrast to a ML detector, which finds the closest valid point to the received noisy signal, an iterative soft-input soft-output MIMO detector provides probabilistic information about the transmitted bits. This soft information is passed to the decoder for the underlying error correction code (ECC), such as turbo or low-density parity check (LDPC) code. The soft outputs of the decoder can be used as new soft inputs for the MIMO detector, and hence this method can work in an iterative fashion to improve the performance of the receiver.

An optimum APP MIMO detector has a very large complexity, because it must enumerate all the signal points of the lattice for the soft metric computation. To reduce the complexity, several schemes have been proposed based on finding a small set, or list, of highly probable points for computing the soft values. List sphere decoding (LSD) is a method in this category, which uses a list of candidates inside a preset sphere for computing the soft information. The main drawback in the known LSD methods is the instability of the list size and the associated problem of the radius selection and reduction during the search. This significantly increases the complexity as compared to the original hard sphere decoding (HSD). This problem can be addressed by building a spherical list centered around the ML point, instead of the received point. However, although the effective list size is well controlled, the size must still be set at a large value to achieve a reasonable performance.

Soft-to-hard transformation is another approach for building a soft detector. The transformation converts a soft detection problem to a set of hard detection problems, which are less complex compared with LSD. This approach, however, imposes some limitations on the underlying modulation and coding schemes. Therefore, this approach can not be considered as a general solution for soft MIMO detection.

Using a stack algorithm with limited stack size is another method of implementing a list detector. Examples of such stack algorithms include list-sequential (LISS) detection, deterministic sequential Monte Carlo (SMC) detection, and iterative tree search (ITS) detection. Stack algorithms evaluate only the 'good' candidate vectors with the aid of a sequential tree searching scheme, based on the m-algorithm. The m-algorithm is a sub-optimum search that retains the best m paths at every instant. The disadvantage of this class of detectors is that the complexity is only a function of the stack size, determined by m, and is independent of the received signal-to-noise ratio (SNR) and channel condition.

It is, therefore, desirable to provide a MIMO receiver and decoding method with low complexity. It is also desirable to provide a MIMO receiver and detection method to separate multiple users multiplexed over multiple transmit antennas.

SUMMARY OF THE INVENTION

In a first aspect the present invention provides a method of detecting and decoding a multiple-input multiple-output (MIMO) signal vector. The method comprises determining, in parallel, soft decision outputs for each symbol in the signal vector in view of a priori soft decoded symbol probabilities; receiving soft decoded symbol probabilities determined in accordance with the soft decision outputs; and iteratively repeating the steps of determining and receiving to decode the signal vector.

According to embodiments of the method determining the soft decision outputs can comprise determining the soft decision outputs in accordance with a channel condition. Determining the soft decision outputs can comprise generating a tree of lattice points by generating all nodes in a level in parallel, and retaining a predetermined number of nodes as nodes for a next level of the tree. Generating the tree can comprise applying sphere decoding techniques. Applying sphere decoding techniques can comprise determining a radius of a hyper-sphere in accordance with the channel condition. Applying sphere decoding techniques can comprise searching for all lattice points contained within the hyper-sphere to determine the generated nodes; and determining a branching factor for each generated node.

The method can also further comprise determining a branching metric for a node by adding branch factors of previous nodes leading to a root node. Retaining only the predetermined number of nodes can comprise retaining m nodes having a highest branch metric, wherein m can be determined adaptively in response to the channel condition. The radius of the hyper-sphere can also be adaptively determined at each level.

In a second aspect, the present invention provides a MIMO receiver for detecting and decoding a MIMO signal vector. The receiver comprises an a posteriori probability (APP) detector operable to iteratively determine, in parallel, soft decision outputs for each symbol in the signal vector in view of a priori soft decoded symbol probabilities; an error correction code (ECC) decoder operable to iteratively provide soft decoded symbol outputs to the APP detector; and a hard decision processor operable to determine a decoded signal set from the soft decoded symbol outputs after a predetermined number of iterations. The ECC decoder can be, for example, a turbo or low-density parity check (LDPC) decoder.

According to embodiments of the receiver, the APP detector can be further operable to determine the soft decision outputs in accordance with a channel condition, and can comprise: a channel estimator operable to estimate the channel condition; a parallel sphere decoder operable to determine, in parallel, a set of soft symbol values, and a corresponding branch metric for each soft symbol value, of the signal vector in view of the channel condition and a priori soft decoded symbol probabilities; and a log-likelihood ratio processor operable to provide the soft decision outputs in accordance with of the set of soft symbol values and branch metrics.

The parallel sphere decoder can be operable to generate a tree of lattice points by generating all nodes in a level in parallel, and comprises a pruning module to prune nodes having the lowest branch metrics at each successive level in the tree. The parallel sphere decoder can be operable to determine a radius of a hyper-sphere in accordance with the channel condition. The parallel sphere decoder can be operable to search for all lattice points contained within the hyper-sphere to generate nodes of the tree, and can be further operable to determine a branching factor for each determined node. The parallel sphere decoder can be operable to determine a branching metric for a node by adding branching factors of previous nodes leading to a root node. The pruning module can be operable to retain m nodes having a highest branch metric. The pruning module can be further operable to adaptively modify m in response to the channel condition.

In a further aspect, the present invention provides a soft MIMO APP detector, comprising: a channel estimator operable to estimate a channel condition; a parallel sphere decoder operable to receive a signal vector, and to determine, in parallel, a set of soft symbol values, and a corresponding branch metric for each soft symbol value, of the signal vector in view of the channel condition and a priori soft decoded symbol probabilities; and a log-likelihood ratio processor operable to provide soft decision outputs in accordance with the set of soft symbol values and branch metrics.

According to embodiments of the detector, the parallel sphere decoder can be operable to generate a tree of lattice points by generating all nodes in a level in parallel, and can comprises a pruning module to prune nodes having the lowest branch metrics at each successive level in the tree. The parallel sphere decoder can be operable to determine a radius of a hyper-sphere in accordance with the channel condition. The parallel sphere decoder can be operable to search for all lattice points contained within the hyper-sphere to generate nodes of the tree, and to determine a branching factor for each determined node. The parallel sphere decoder can be operable to determine a branching metric for a node by adding branching factors of previous nodes leading to a root node. The pruning module can be operable to retain m nodes having a highest branch metric. The pruning module can be further operable to adaptively modify m in response to the channel condition.

In accordance with a further aspect, the present invention provides a parallel sphere decoder for a soft MIMO APP detector. The parallel sphere decoder comprises a signal conditioning block operable to condition a MIMO signal vector in accordance with a channel estimation; a parallel search block operable to receive the conditioned signal vector, and to determine, in parallel, a set of soft symbol values, and a corresponding branch metric for each soft symbol value, of the signal vector in view of the channel condition and a priori soft decoded symbol probabilities; and a pruning block operable to retain a set of m soft symbol values having highest branch metrics at each level of a decision tree.

According to embodiments of the parallel sphere decoder, the parallel search block can be operable to generate a the decision tree by generating all nodes in a level in parallel, and the pruning block can be operable to prune nodes having the lowest branch metrics at each successive level in the tree. The parallel search block can be operable to determine a radius of a hyper-sphere in accordance with the channel estimation. The parallel search block can be operable to search for all lattice points contained within the hyper-sphere to generate nodes of the tree, and to determine a branching factor for each determined node. The parallel search block can be operable to determine the branch metric for a node by adding branching factors of previous nodes leading to a root node. The pruning block can be further operable to adaptively modify m in response to the channel estimation. The signal conditioning block can be further operable to condition the channel estimation. The signal conditioning block can be operable to decompose and triangularize a channel estimation matrix.

The parallel sphere decoder can further comprise a log-likelihood ratio processor operable to provide soft decision outputs in accordance with of the set of soft symbol values and branch metrics.

According to a further aspect, the present invention provides a method of parallel sphere decoding, comprising: conditioning a MIMO signal vector in accordance with a channel estimation; determining, in parallel, a set of soft symbol values, and a corresponding branch metric for each soft symbol value, of the signal vector in view of the channel condition and a priori soft decoded symbol probabilities; and pruning the set of soft symbol values to retain those having the highest branch metrics.

In a further aspect, the present invention provides a MIMO communication system, comprising: a transmitter operable to provide an ECC encoded signal block of multiple signals; and a receiver having an APP detector operable to iteratively determine, in parallel, soft decision outputs for each symbol in the signal vector in view of a priori soft decoded symbol probabilities; an ECC decoder operable to iteratively provide soft decoded symbol outputs to the detector; and a hard decision processor operable to determine a decoded signal set from the soft decoded symbol outputs after a predetermined number of iterations. The ECC encoded signal block can be, for example, turbo encoded or LDPC encoded.

In yet another aspect, the present invention provides a method for performing APP signal detection, comprising: estimating a channel condition; decoding symbols of a signal vector, in parallel, to determine a set of soft symbol values, and a corresponding branch metric for each soft symbol value, of the signal vector in view of the channel condition and a priori soft decoded symbol probabilities; and providing soft decision outputs in accordance with of the set of soft symbol values and branch metrics.

BRIEF DESCRIPTION OF THE DRAWINGS

Embodiments of the present invention will now be described, by way of example only, with reference to the attached Figures, wherein.

DETAILED DESCRIPTION

Figure 1:
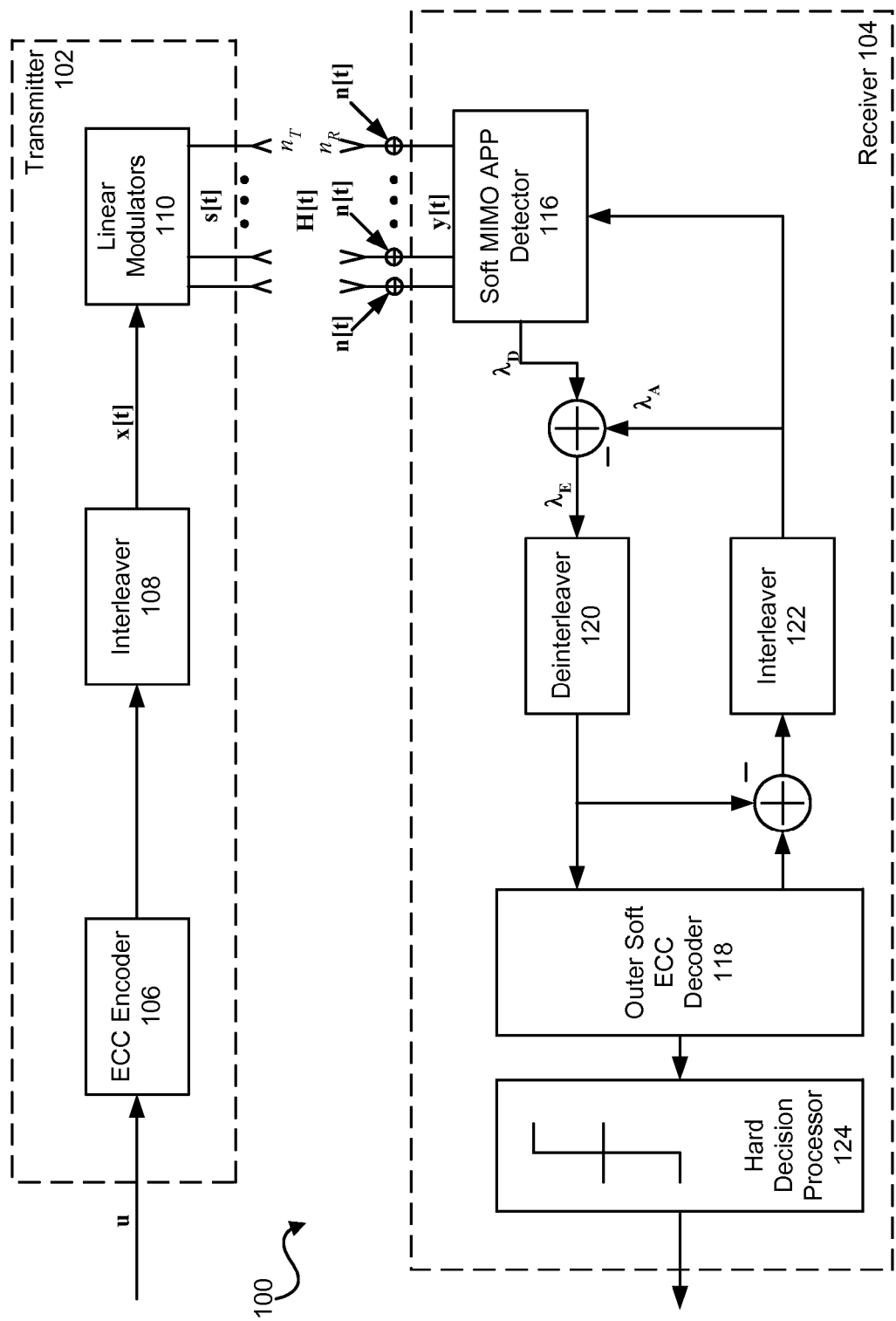
FIG. 1 is a block diagram of a MIMO system according to an embodiment of the present invention.

Generally, the present invention provides a method and system for parallel decoding of multiple signals. The invention provides a low-complexity list MIMO detector that combines sphere decoding and m-algorithm approaches, while accounting for the effect of the specific channel realization on the decoding operation. Taking into account the channel condition effectively controls the size of the search tree, and consequently the search complexity, in an adaptive manner. The channel condition is exploited in the construction of the tree to manage the number of branches in the tree and to avoid undesirable growth. A method for searching the tree structure using lattice decoding in parallel, while limiting the complexity by discarding unnecessary paths in the tree, together with methods for parallel iterative decoding/de-mapping of users, including the case occurring in the uplink of an SDMA system, is provided.

More particularly, a sub-optimum a posteriori probability (APP) detector is provided for iterative joint detection/decoding in lattice based communications systems employing an outer code. As optimal APP detection is extremely complex, a low-complexity detector is extended based on sphere decoding and m-algorithm concepts. The detector searches over a sequential tree inside a preset sphere in a parallel manner to simultaneously find a list of m-best points based on an additive metric. The metric is computed by combining the channel output and the a priori information. The radius of the sphere and the value of m are selected according to the channel condition to reduce the complexity. The proposed method and system can, for example, be applied to the decoding of MIMO codes employed in the IEEE 802.16 standard.

Several methods have been proposed to implement lattice searching inside a sphere, as described above. This class of methods can generally be considered as sphere decoders. The common property of these methods is that they all work serially to enumerate the lattice points inside a sphere. The drawback of a serial lattice search is that it cannot be combined with the m-algorithm pruning for further complexity reduction. To combine sphere decoding and m-algorithm approaches, the conventional sphere decoder methods need to be modified to work in a parallel manner. The parallel sphere decoding (PSD) described herein grows all nodes at a given level of the tree simultaneously to find the best paths. Thanks to the parallel structure of the parallel sphere decoder algorithm, an m-algorithm approach can also be used in PSD to reduce the complexity by eliminating or pruning less relevant branches of the tree during the lattice search. The radius of the sphere and the value of m can be selected according to the channel condition to reduce the complexity. PSD has the benefits of both sphere and m-algorithm detectors, while substantially avoiding their drawbacks.

The branching factor at each level of the decoding tree is decided based on the distance properties of the equivalent triangularized signal set along that dimension, corresponding to a given level in the tree. This is equivalent to limiting the search in the triangularized signal set within a parallelotope. The edge length of the parallelotope (edge length $\delta_i$, along the ith dimension) divided by the minimum distance of the triangularized lattice along that dimension determines the number of points, or branching factor, in the corresponding segment of the tree. As higher numbers of branches at higher levels of the tree result in a multiplicative increase in the number of paths at the lower levels, the channel matrix is reordered prior to triangularization, such that the norm of the diagonal elements are successively maximized. This can be easily achieved by using the matrix operations explained in: G. H. Golub and C. F. Van Loan, "Matrix computations", Johns Hopkins University Press, Baltimore, Md., 1983.

Although probability calculations based on the additive noise result in the parallelotope having the same edge length in all the dimensions, there are two conflicting factors that can affect the selection of the branching factor, or equivalently, the edge length of the parallelotope. Generally, it is preferable to have larger edge lengths at the higher levels of the tree to increase the computational accuracy at the higher levels, since the error in the higher levels would affect their descendant nodes in the tree. In practice, as the constellation points are selected based on rounding the ratio of the edge length to the minimum distance along the corresponding dimension to the next integer, and the minimum distance at higher levels is larger due to pre-ordering of the triangularized matrix, the effective edge length at the higher levels will be larger.

Limiting the constellation points with the edge length of the parallelotope along the ith dimension is equivalent to using a one-dimensional sphere along the one-dimensional sub-spaces. This can be generalized to using a higher dimensional sphere along a subset of coordinates. The radius of such spheres can be determined according to the noise level, and the number of constellation points inside them differs for the spheres at different levels, as the volume of the sub-constellations along those dimensions is different. The product of the diagonal elements of the triangularized matrix determines the volume. This volume is larger at higher levels of the tree as the channel matrix is pre-processed to order the diagonal elements in the triangularized matrix. This provides different numbers of branches at different levels of the tree, inversely proportional to the volume of the underlying sub-lattice. This is equivalent to merging several levels of the tree and adjusting the branching factor at each level of the merged tree.

On the other hand, the total number of branches at a given level should be limited to avoid exponential growth of the tree. Accordingly, the maximum number of branches, according to the volume of the signal set, which shows the number of constellation points in a given volume is determined. Although one could select the total number of branches differently at different depths of the tree, based on the discussion below, the same rule can be applied to all the levels in the tree.

FIG. 1 shows a bit interleaved coded modulation (BICM) MIMO system 100 with transmitter 102 and iterative APP receiver 104. A block of information bits u is encoded by a rate R outer code C at outer ECC encoder 106. Encoder 106 implements an ECC encoding scheme, such as turbo or LDPC encoding, as is well known in the art. The encoded stream is then permuted by an interleaver 108. At time t, the bits of the sequence $x[t]=(x_1[t], \ldots, x_{M_C n_T}[t])^T$ as a part of the permuted stream are mapped onto a complex vector $s[t]=map(x[t])=(s_1[t], \ldots, s_{n_T}[t])^T$ by $n_T$ linear modulators 110. Each element $s_i[t]$ is taken from a complex constellation Q composed of $2^{M_C}$ distinct points, such as a $2^{M_C}$-QAM (Quadrature Amplitude Modulation) constellation. The output of the modulators 110 are passed through a narrow-band multiple antenna channel with $n_T$ transmit antennas 112 and $n_R$ receive antennas 114. For ease of understanding it is assumed that $n_T=n_R$ throughout this discussion, although, as will be well understood by those of skill in the art, the present invention is not limited to this case.

Although the receiver 104 is illustrated in FIG. 1 as interacting with transmitter 102 having multiple linear modulators 110, one skilled in the art will appreciate that receiver 104 can also receive signals transmitted from multiple transmitters, each having either a single antenna or a multiple antenna array. In such cases, each transmitter would also include its own ECC encoder and interleaver. For example, using an air-interface based on code-division multiple access (CDMA), multiple transmitters can each transmit to receiver 104 using a different code division such that their signals are mutually orthogonal to each other. This permits receiver 104 to receive the signals at its multiple antennas to aid in the recovery of the multiple signals. Thus, receiver 104 can be used in systems compliant with the WiMAX and Mobile WiMAX standards (IEEE 802.16 standards such as IEEE 802.16e) and receive signals from a plurality of different transmitters in a network. Receiver 104 effectively acts as a hub that receives data from each of the transmitters in the network simultaneously, and provides simultaneous detection and decoding of the multiple signals.

Let $y[t]=(y_1[t], \ldots, y_{n_R}[t])^T$ be an $n_R$-dimensional vector of received signals given by, $$y[t]=H[t]s[t]+v[t] \quad (1)$$

where the channel matrix $H[t]=(h_{ij}[t])$ is a matrix of dimension $n_R \times n_T$ with entries that are independent samples of a complex Gaussian random variable with zero mean and unit variance (Rayleigh fading) determined by the channel condition. We assume that H[t] is known to the receiver, and can be determined by, for example, transmitting a known pilot signal, as is well known in the art. Entries of v[t] are the spatially and temporally complex white Gaussian noises with variance $\sigma^2$ per real component. Assuming $E\|s_i[t]\|^2 = E_s/n_T$ makes the total transmit power equal to $E_s$. The overall bandwidth efficiency of such a system is $RM_C n_T$ bits per channel use.

Since the bits among the blocks $x[t]$, $t=1, 2, \ldots$ are outputs of an ECC encoder that introduces redundancy, block-by-block decision on the bits is no longer optimal. Therefore, an APP MIMO detector should make decisions jointly on all blocks based on the correlation across blocks, and the channel code should decode using soft information on all the blocks obtained from the APP MIMO detector. Therefore, an iterative receiver that performs joint detection and decoding is needed.

The iterative receiver 104 consists of two stages: a soft-input soft-output MIMO APP detector 116, followed by a soft ECC decoder 118. The two stages are separated by a deinterleaver 120 and an interleaver 122. FIG. 1 illustrates how the soft input and output information is iterated between the MIMO APP detector 116 and the soft ECC decoder 118.

As the MIMO APP detector 116 operates on each symbol vector separately, the time index can be omitted. The soft-decision outputs are represented as log-likelihood ratios (LLRs) of the a posteriori symbol probabilities. The optimal log-likelihood ratio $\lambda_D(x_k|y)$ of the bit $x_k$, $k=1, \ldots, M_C n_T$, knowing the received vector y, is obtained by the MIMO APP detector 116 as follows:

$$\lambda_D(x_k \mid y) = \ln \frac{P(x_k = +1 \mid y)}{P(x_k = -1 \mid y)} \quad (2)$$

which constitutes the a posteriori information about $x_k$. Due to interleaving of the symbol bits at interleaver 108, the bits within x are approximately statistically independent. Employing Bayes' theorem, exploiting the independence among the entries of x, and considering the channel model given by Eq. (1), the soft output values of the MIMO APP detector 116 are given by $$\lambda_D(x_k \mid y) = \ln \frac{\sum_{x \in X_k^+} \exp(\Lambda(x, \lambda_A; y, H))}{\sum_{x \in X_k^-} \exp(\Lambda(x, \lambda_A; y, H))} \quad (3)$$

where $$\Lambda(x, \lambda_A; y, H) = -\frac{1}{2\sigma^2}\|y - Hs\|^2 + \frac{1}{2}x^T \lambda_A \quad (4)$$

is the probability information and $\chi_k^{\pm} = \{x | x_k = \pm 1\}$. With $$\lambda_A(x_k) = \ln \frac{P(x_k = +1)}{P(x_k = -1)}$$

denoting the a priori information of $x_k$, we define $\lambda_A = (\lambda_A(x_1), \ldots, \lambda_A(x_{M_C n_T}))^T$. The a priori information is received from the previous iteration as the soft output of the ECC decoder 118, and subtracted from the a posteriori soft output of the MIMO APP detector 116, as shown in FIG. 1, to arrive at the extrinsic soft information of $x_k$ given by $\lambda_E(x_k|y) = \lambda_D(x_k|y) - \lambda_A(x_k)$.

The ECC decoder 118 uses the extrinsic soft information provided by the MIMO detector 116 to update its knowledge about the transmitted bits. The new soft information of the bits serves as the a priori information for the next iteration. After a given number of iterations, the soft output of ECC decoder 118 is provided to a hard decision processing block 124 to provide the decoded signal set.

The number of vectors x in the set $\chi$ is equal to $2^{M_C n_T}$. Therefore, noting Eq. (3), the complexity of computing the a posteriori LLR $\lambda_D(x_k|y)$ is exponential to the length of the bit vector x.

Empirical observation shows that the vast majority of the elements of $\chi$ contribute a negligible amount to the summations in Eq. (3). Therefore, the complexity of the calculation of the a posteriori soft information $\lambda_D(x_k|y)$ can be decreased by enumerating only the high-$\Lambda$-value subset of lattice points denoted as $\mathcal{L}$. The list detection problem can be formulated as finding the set of points $\mathcal{L} \subset \chi$ with cardinality $|\mathcal{L}| = m < 2^{M_C n_T}$ and the highest $\Lambda$-values:

$$\mathcal{L} = \arg\max_{\substack{\mathcal{L}' \subset \chi \times \mathcal{L}' \\ |\mathcal{L}|=m}} \min_{x \in \mathcal{L}'} \Lambda(x, \lambda_A, y, H) \quad (5)$$

The problem of finding the optimum list is in general NP-hard. As will be described further below, the PSD approach according to the present invention can be used to find a 'good' list inside a sphere of given radius. Also, the complexity of the sphere decoder can be further reduced by applying a preprocessing stage, in which the ordering of the columns of H is considered. This is equivalent to a reordering the elements of the data vector. The standard preprocessing and ordering consists of a decomposition, such as a QR decomposition, of the channel matrix H. The goal of this ordering is to find the permutation matrix Π such that the R component of the QR decomposition of HΠ has a predefined property. The permutation matrix permutes the columns of H. For example, H can be selected such that the diagonal entries of R are successively maximized, noting that the SNR of each dimension is proportional to the square norm of the corresponding diagonal component of R. With this ordering method, the tree layers that are closest to the root of the tree have the greater SNR. When SNR is high for a dimension, the corresponding nodes of that dimension can be expanded by the smaller number of branches, because of the relatively higher reliability of the decisions made at higher SNRs. This limits the exponential growth of the tree size as the branching factor in the higher order levels of the tree will have a multiplicative effect on the total number of paths.

If node expansion is limited in the interval $[-\delta, \delta]$, then the total points inside that interval is proportional to $2\delta/|r_{kk}|^2$ for the kth dimension. Therefore, the search inside the lattice can be limited to the intersection of a hyper-sphere and a hyper-cube to further reduce the computational costs of the lattice search algorithm.

According to Eq. (4), in the absence of a priori information, the required candidate points of the list can be defined as follows:

$$\forall x' \notin \mathcal{L}, \forall x \in \mathcal{L}, \|y-Hs\|^2 << \|y-Hs'\|^2 \quad (6)$$

The list $\mathcal{L}$ contains points inside a sphere centered at the received point y. Conventional HSD algorithms search the closest points in a serial manner based on the distance metric. Starting with an initial radius, the sphere decoder finds a candidate point and updates the sphere radius, which cannot exceed the initial radius. After that, the sphere decoder starts the search process over, using the newly computed radius to find any better candidate points. This process continues until the closest point is found. In LSD, a list of points is found within a preset sphere and the radius cannot be decreased during the search process.

Note that if the radius is fixed, there is no difference between the complexity of serial and parallel search schemes. The PSD of the present invention grows all the branches inside the sphere simultaneously to find all the candidate points. However, analogous to conventional m-algorithm approaches, the search can be limited to the signal paths with the highest branching factor Λ-values at each level of sequential tree growth. The search algorithm takes into account both the distance and the a priori information to find the highest Λ-value points. The additive nature of the Λ-values permits the branch metrics to be calculated sequentially in the tree structure. At each level of tree growth, existing nodes are explored inside the sphere, the new extended branches are ordered, and finally, the m-best branches are selected and the rest are eliminated. Unlike techniques that use a fixed branching factor and fixed m, the present invention permits selection of the branching factor as well as the value of m adaptively according to the channel matrix H.

In order to use sphere decoding, the complex model of Eq. (1) must first be extended to the real space. The channel matrix is changed to the real matrix $H \leftarrow (H_{ij})$ using, $$H_{ij} = \begin{pmatrix} \Re h_{ij} & -\Im h_{ij} \\ \Im h_{ij} & \Re h_{ij} \end{pmatrix} \quad (7)$$

where $\Re h_{ij}$ and $\Im h_{ij}$ denote the real and the imaginary part of $h_{ij}$, respectively. Accordingly, the matrix dimensions are extended to $n_T \leftarrow 2n_T$ and $n_R \leftarrow 2n_R$. The number of bits per real dimension is $M_C \leftarrow M_C/2$. The complex vector of the symbols is extended to the real vector $s \leftarrow (s_i)$ as follows:

$$s_i = \begin{pmatrix} \Re s_i \\ \Im s_i \end{pmatrix} \quad (8)$$

The other complex vectors n and y are extended in the same way. The derivations for the complex model hold for the extended real model, as well.

In order to compute the branching factor Λ sequentially over the branches of the tree, a QR decomposition of the matrix H=QR, with optional proper ordering of columns as explained earlier, is performed, where $R=(r_{ij})$ is an $n_T \times n_T$ upper triangular matrix and Q is a $n_R \times n_T$ unitary matrix. The distance $\|y-Hs\|^2$ can be written as $\|z-Rs\|^2$ in which $z=Q^H y$. Expanding Λ in (4) to the summation form results in an additive metric:

$$\Lambda(x, \lambda_A; z, R) = \sum_{i=1}^{n_T} \Lambda_i \quad (9)$$

with branch metric increments for each branch propagating from a node of the tree:

$$\Lambda_i = -\frac{1}{2\sigma^2}\left(z_i - \sum_{j=1}^{n_T} r_{ij} s_{ij}\right)^2 + \frac{1}{2}\sum_{j=1}^{M_C} x_{ij} \lambda_A(x_{ij}) \quad (10)$$

in which $x_{ij}=x_{(i-1)M_C+j}$ for $i=1, 2, \ldots, M_C$ and $j=1, 2, \ldots, M_C$. Using this definition, $s_i = \text{map}(\{x_{ij}\}_{j=1}^{M_C})$. Referring to Eq. (10), $\Lambda_i$ depends only on the transmit symbols $s_j$ for $j \geq i$ and the a priori values corresponding to $s_i$.

The PSD method searches for the candidate points inside a sphere of radius C limited by a parallelotope. The edge length of the parallelotope is selected to be δ. The condition imposed by the parallelotope is expressed as part of the PSD algorithm. The condition imposed by the sphere results in $\|z-Rs\|^2 < C^2$ or $$\sum_{i=1}^{n_T}\left(z_i - \sum_{j=1}^{n_T} r_{ij} s_{ij}\right)^2 < C^2 \quad (11)$$

Each element of the summation should satisfy the inequality. Starting from the $n_T$th element and assuming $r_{n_T n_T} > 0$ (since R is real, without loss of generality, it can be assumed that $r_{ii}>0$ for $i=1, \ldots, n_T$)) it can be concluded that $s_{n_T}$ belongs to the following interval:

$$\left\lceil \frac{-C+z_{n_T}}{r_{n_T n_T}} \right\rceil \leq s_{n_T} \leq \left\lfloor \frac{C+z_{n_T}}{r_{n_T n_T}} \right\rfloor \quad (12)$$

where $\lceil \cdot \rceil$ and $\lfloor \cdot \rfloor$ denote the ceiling and floor operations. For every $s_{n_T}$ satisfying (12), we define $C^2_{n_T-1|n_T}=C^2-(z_{n_T}-r_{n_T n_T}s_{n_T})^2$ and $z_{n_T-1|n_T}=z_{n_T-1}-r_{n_T-1,n_T}s_{n_T}$. Noting the $(n_T-1)$th term in (11), we conclude that $s_{n_T-1}$ belongs to the following interval (condition imposed by the sphere):

$$\left\lceil \frac{-C_{n_T-1|n_T}+z_{n_T-1|n_T}}{r_{n_T-1,n_T-1}} \right\rceil \leq s_{n_T-1} \leq \left\lfloor \frac{C_{n_T-1|n_T}+z_{n_T-1|n_T}}{r_{n_T-1,n_T-1}} \right\rfloor \quad (13)$$

One can continue in a similar manner for $s_{n_T-2}$ and so on until $s_i$, thereby going through all the candidate points inside the sphere of radius C.

The radius C is chosen based on the statistics of the noise. Noting that $$\frac{1}{2\sigma^2}\|v\|^2 = \frac{1}{2\sigma^2}\|y-Hx\|^2$$

is a $\chi^2$ random variable with $n_R/2$ degrees of freedom, the radius of the sphere can be chosen proportional to the variance of the noise:

$$C^2=K_r n_R \sigma^2 \quad (14)$$

where the radial factor $K_r$ controls the tradeoff between complexity and performance. A larger value for $K_r$, and hence C, will improve the performance at the price of an increase in the complexity. Due to the structure of the sphere, the effective radius tends to decrease as each sequential level of the tree is traversed, resulting in a smaller range for the enumeration of points along the lower dimensions. On the other hand, larger branching factors can be afforded at lower levels of the tree, as the effect of exponential growth in the size will be less as one moves down the tree. The conditions imposed by the parallelotope incorporate this effect and do not permit the effective radius to become too small at the lower levels. Ordering the channel matrix results in larger branching factors at subsequent levels of the tree, because the diagonal elements of the triangularized matrix ($r_i$'s in the given algorithm) become smaller at lower levels.

The pruning of the paths as the search moves down the tree also controls the complexity stemming from the computed likelihood values. Since the number of points bounded within a sphere of a given radius is inversely proportional to det($HH^H$), the pruning factor m can be selected as follows:

$$m = \min\left(K_m \frac{\prod_{i=1}^{n_T}\|h_i\|^2}{\det(HH^H)}, m_{max}\right) \quad (15)$$

where $h_i$ is the ith column of H. Note that the term $$\frac{\prod_{i=1}^{n_T}\|h_i\|^2}{\det(HH^H)}$$

is known as the orthogonality defect of the matrix H. The projection of a lattice on different coordinates might have different number of points, because some points of the lattice might have the same projection on a specific coordinate. However, since H represents a random lattice, there is a low probability that two different points of the lattice have the same projection on a coordinate. Consequently, although the pruning factor m can be determined at each level of the tree, it is reasonable to use a set m as the number of nodes which are kept not only in the final level but also for every level of the tree search. The values of $\delta$, $K_r$, $K_m$ and $m_{max}$ are experimentally selected or predetermined to minimize the complexity, while achieving the best possible performance. Imposing an upper bound on the allowed m limits the peak complexity.

Figure 2:
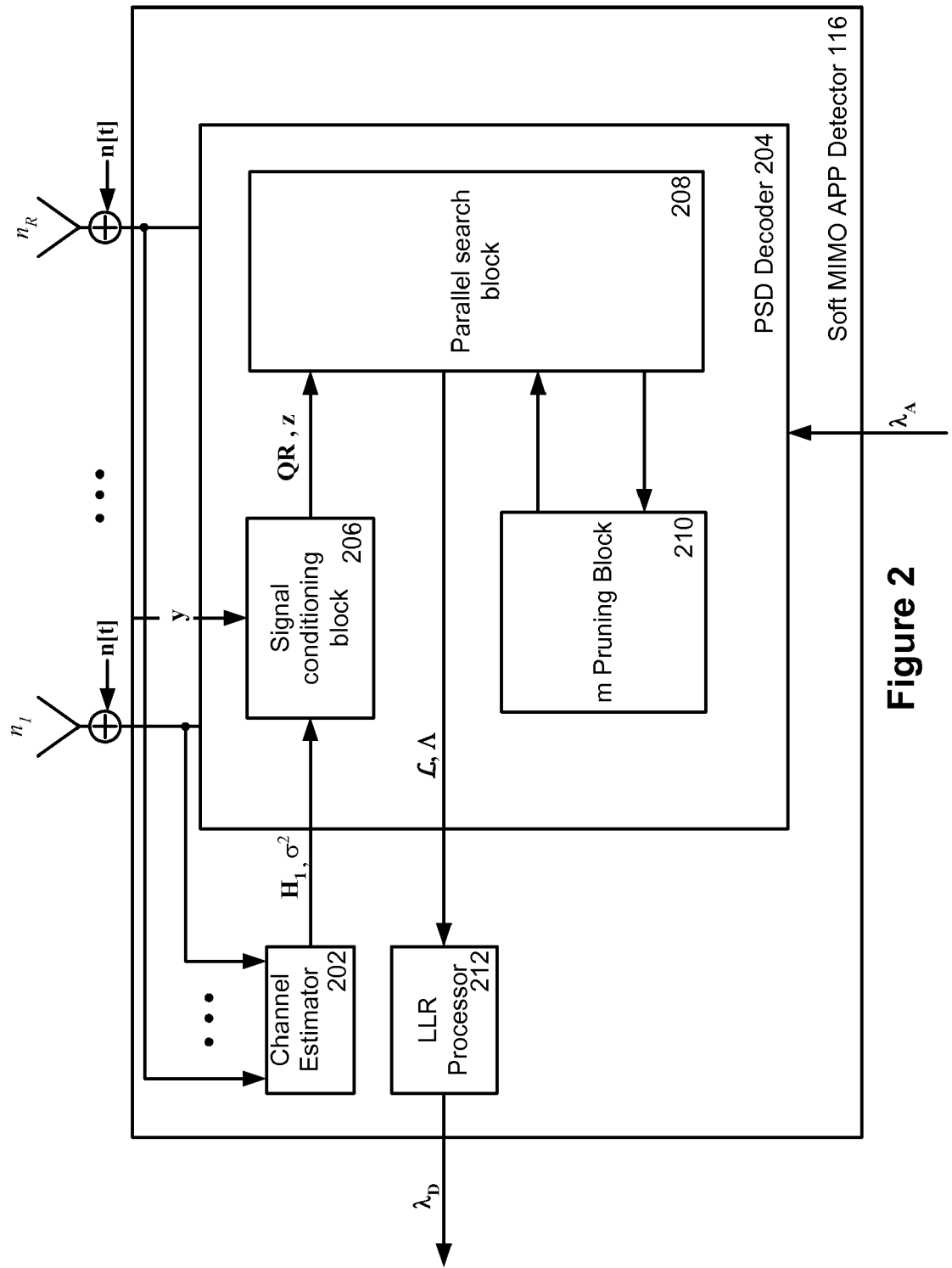
FIG. 2 is a block diagram of a receiver according to an embodiment of the present invention.
Figure 3:
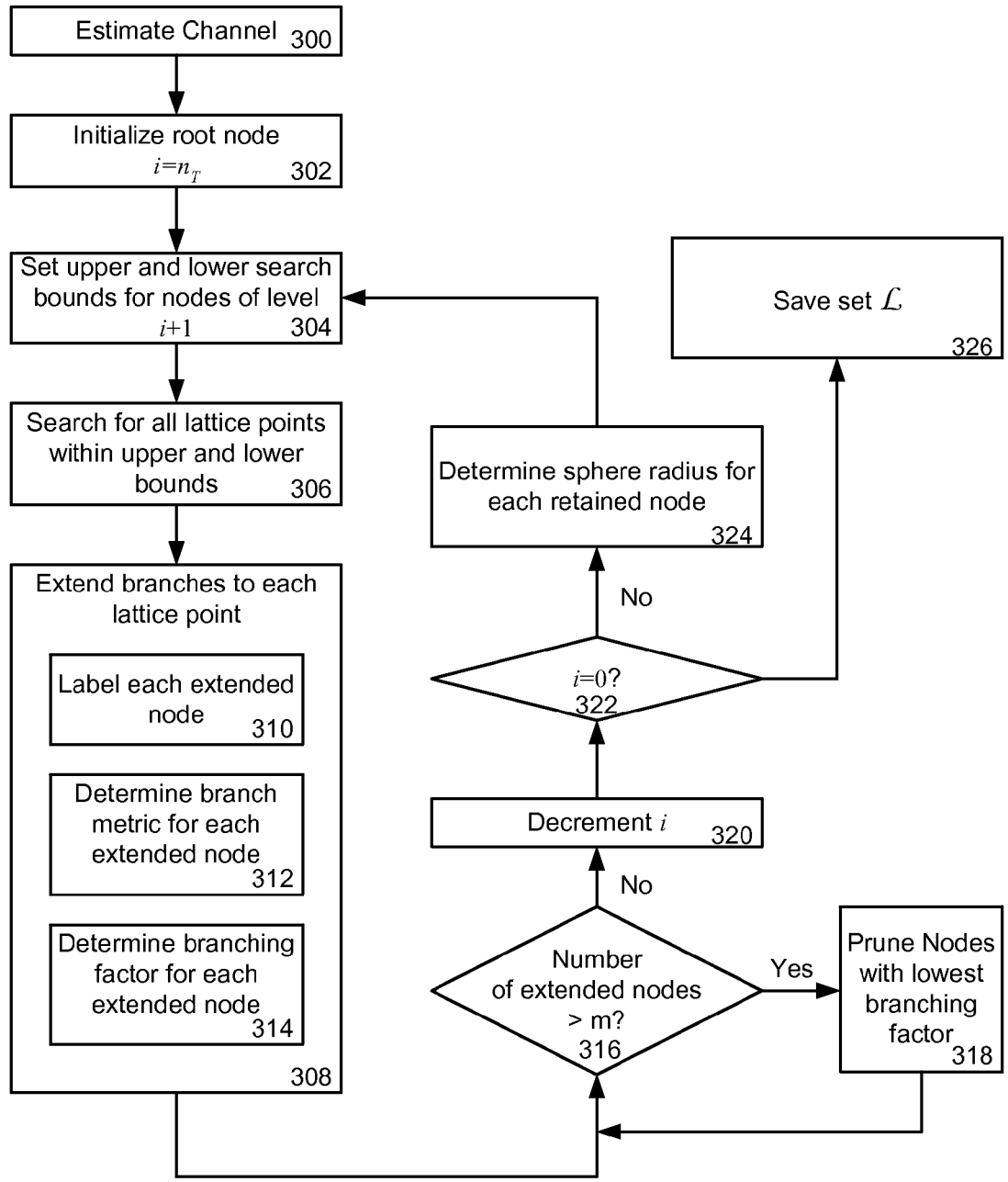
FIG. 3 is a flowchart of a decoding and detection method according to an embodiment of the present invention.

Referring to FIGS. 2 and 3, which illustrate a soft MIMO APP detector 116 and a flowchart of the method, respectively, according to an embodiment of the present invention, the operation of the present invention can be summarized as follows. The inputs to the MIMO APP detector 116 are the channel matrix H, received signal vector y, a priori LLR $\lambda_A$, noise variance $\sigma^2$, number of transmit antennas $n_T$, number of receive antennas $n_R$, and constellation size $M_C$. All the inputs are in the real space. The channel matrix H and noise variance $\sigma^2$ are estimated (step 300) in the channel estimator 202 according to any known method. The maximum number of retained nodes at each level of the tree is determined by the pruning factor m, which is dependent on the channel matrix H, as described above. The pruning factor m can be provided by the channel estimator 202, or can be calculated by the PSD decoder 204. The $2^{M_C}$ points of the real constellation are the elements of the real set $Q_r$, where $Q=\{Q_r+jQ_r\}$.

The channel matrix H can be preordered and decomposed: H to QR, and the signal vector can be transformed accordingly $z=Q^H y$ by an optional signal conditioning block 206 in the PSD decoder 204. Each node in the eventual decoding tree will have its own level i, branch metric $\alpha_i$, label (defined as the path from the root node to the particular node), bit values $s_i=(s_i, \ldots, s_{n_T})$ or $x_i=\{\{x_{kj}\}_{j=1}^{M_C}|k=i, \ldots, n_T\}$, associated sub-sphere radius for the next level $C_{i-1|i}$, and received signal for the next level $z_{i-1|i}$. At initialization (step 302), the root node (level $n_T+1$) is initialized with $\alpha_{n_T+1}=0$, $C_{n_T|n_T+1}=C$, $z_{n_T|n_T+1}=z_{n_T}$, and an empty label. The total number of nodes is set to 1, and i is set to $i=n_T$.

The method then proceeds to perform parallel sphere decoding at the parallel search block 208 for each node of the level i+1. Upper and lower bounds for the sphere decoding search are set for each node (step 304): for lower bound LB, set $A=\max(\delta,C_{i|i+1})$ and set $$LB = \left\lceil \frac{-A+z_{i|i+1}}{r_{ii}} \right\rceil;$$

for upper bound UB set $A=\max(\delta, C_{i|i+1})$ and set $$UB = \left\lceil \frac{A + z_{i|i+1}}{r_{ii}} \right\rceil.$$

A search for all lattice points within the upper and lower bounds is then performed at each node in the level (step 306). This search is performed in parallel for each node in the level. Branches are then extended (step 308) to each lattice point identified in the search: $s_i \in [LB, UB] \cap Q_r$, which are nodes in the next level of the tree. For each extended node $s_i$ and its corresponding bit label: the extended node is labeled (step 310) as $s_i = (s_i, s_{i+1})$ or $x_i\{\{x_{ij}\}_{j=1}^{M_C}, x_{i+1}\}$; the branch metric increment is determined (step 312):

$$\Lambda_i = \frac{1}{2\sigma^2}(z_{i|i+1} - r_{ii}s_i)^2 + \frac{1}{2}\sum_{j=1}^{M_C} x_{ij}\lambda_A(x_{ij});$$

and the branching factor is updated (step 314): $\alpha_i = \alpha_{i+1} + \Lambda_i$.

If the number of potential nodes of the next level i is more than m (step 316), a pruning block 210 selects (step 318) the m nodes with the highest branch factors, and eliminate the remaining nodes at level i, and the number of nodes in the level i is updated to the number of selected nodes. If the number of nodes is less than m all nodes at level i are kept.

The method then proceeds to the next level by decrementing i: $i \leftarrow i-1$ (step 320) and determining that there are still levels left in the tree to search (step 322). If there are levels still left to search, the parameters of the nodes of the level i+1 are updated (step 324):

$$z_{i|i+1} = z_i - \sum_{j=i+1}^{n_T} r_{ij}s_j;$$

and $C^2_{i|i+1} = C^2_{i+1|i+2} - (z_{i+1|i+2} - r_{I+1,i+1}s_{i+1})^2$; and the method continues to the next tree level at step 304.

Once the tree has been fully traversed (i=0), the label $(s_1, \ldots, s_{n_T})$ or $(x_1, \ldots, x_{M_C n_T})$ and its corresponding branch metric $\Lambda = \alpha_1$ is saved in a set $\mathcal{L}$ for each node of the last level (level 1). The outputs from the PSC decoder 204 are the set $\mathcal{L}$ and the corresponding $\Lambda$-values.

Proper selection of the parameter $\delta$ enables us to have proper branching factor at different levels, while avoiding the excessive growth in the size of the tree due to being forced to use a large C. The output of the proposed PSD is a sub-optimum solution to the list detection problem of Eq. (5). Although the list that is found by the PSD contains the m points with the highest $\Lambda$-values, these points are not necessarily the m best points. Some branches which are eliminated in the middle levels of the tree might be the paths which eventually tend to the optimum points. In other words, a path which tends to an optimum node of a middle tree level is not necessarily a portion of a path which tends to an optimum point of the last level of the tree search. Experimental results show that there is a large overlap among the sets of the best paths corresponding to the different levels of the tree. This means that with a high probability, the m nodes which are the best points of a middle level of the tree belong to the paths which represent the m best points of the optimum list.

After finding the list $\mathcal{L}$ and its corresponding $\Lambda$-values, the list is provided to a LRR processing block 212 which applies Eq. (3) to compute the APP values of the transmitted bits. To maintain a reasonable complexity, the exact exp(.) operation in Eq. (3) is implemented in the log-domain by deploying a max- or max*-approximation. With the max approximation, the a posteriori information of $x_k$ becomes:

$$\lambda_D(x_k | z) \approx \max_{x \in \chi_k^+ \cap \mathcal{L}} \{\Lambda(x, \lambda_A, z, R)\} - \max_{x \in \chi_k^- \cap \mathcal{L}} \{\Lambda(x, \lambda_A, z, R)\} \quad (16)$$

in which the maximizations are over the points of the list $\mathcal{L}$. If $\chi_k^- \cap \mathcal{L}$ (or $\chi_k^- \cap \mathcal{L}$) is empty, then $\lambda_D(x_k|z)$ is set to the given minimum (or maximum) value of the LLR.

The functional blocks, or equivalent modules and components, described above in relation to the receiver, APP detector and PSD decoder of the present invention can be implemented as software, hardware or a combination of hardware and software. For purposes of explanation, numerous details are set forth in order to provide a thorough understanding of the present invention. However, it will be apparent to one skilled in the art that these specific details are not required in order to practice the present invention. Structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism, and can be implemented as an application specific integrated circuit (ASIC) or other hardware component. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine-readable medium may interface with circuitry to perform the described tasks.

Numerical results are provided for a coded MIMO system implementing a parallel sphere decoder according to the present invention. A parallel concatenated turbo code with rate R=½ is used in the coded MIMO system. Each constituent convolutional code has memory 2, feedback polynomial $G_r(D)=1+D+D^2$, and feed forward polynomial $G(D)=1+D^2$. The interleaver size of the turbo code is 9214 information bits. The receiver performs four outer iterations between the turbo decoding and the MIMO channel detection blocks, and eight inner iterations within the turbo decoder. Numerical results show a significant reduction in the average complexity, for a similar performance and peak complexity, as compared to previous methods.

The signal power per transmitted information bits at the receiver side is defined as:

$$\frac{E_b}{N_0}\bigg|_{dB} = \frac{E_s}{N_0}\bigg|_{dB} + 10\log_{10}\frac{n_R}{RM_C n_T} \quad (17)$$

Figure 4:
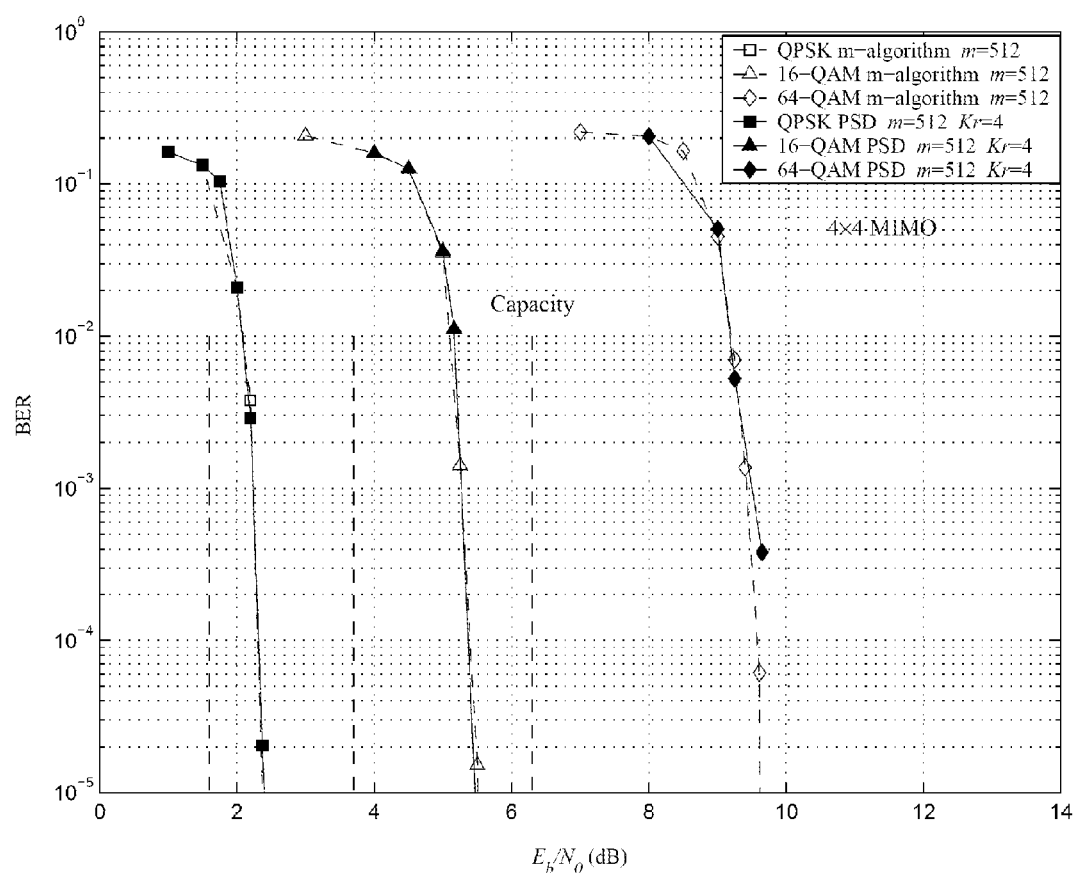
FIGS. 4-9 are plots of numerical results for various embodiments of the present invention.

FIG. 4 shows the performance results for a 4×4 MIMO system. The list size is set to m=512 which is fixed regardless of the channel condition. According to FIG. 4, the performance of the PSD ($K_r$=4) is the same as an m-algorithm detector (or PSD with $K_r$=∞). This means that the sphere detection does not degrade the performance of the PSD. By comparing the results of the PSD with LSD results, it can be seen that there is no degradation between PSD and the best results obtained by the LSD approach.

Figure 5:
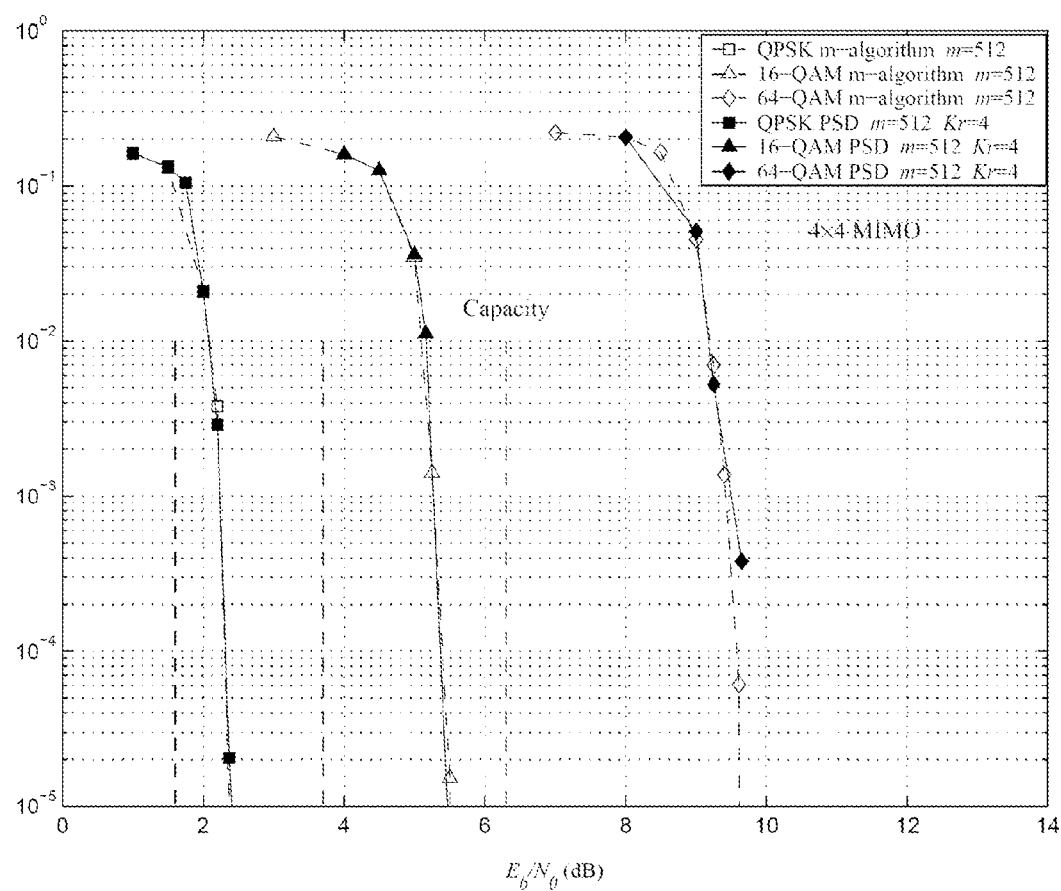

The advantage of the proposed method lies in its complexity of detection which is illustrated for a 16-QAM 4×4 MIMO system as shown in FIG. 5. As this figure shows, the complexity of the PSD method for m=512 and $K_r$=4 and 8 is much less than the m-algorithm and LSD with the same parameters. Computational complexity is measured in terms of the number of branches enumerated at each level of the tree. The higher the number of constellation points and/or the number of antennas, the higher the complexity gain that can be achieved using PSD.

According to FIG. 5, the complexity of the m-algorithm is fixed independent of the channel condition and the SNR value. This causes the m-algorithm to have a very high complexity for large SNR values, where the other two methods have lower complexities.

One advantage of the proposed PSD is that its complexity does not exceed a threshold, which is determined by the m-algorithm, even at low SNR values where the sphere radius is large. In other words, in contrast to the LSD which has exponential worst case complexity, the worst case complexity of PSD, which is equal to the complexity of the m-algorithm, is linear in terms of the number of antennas and the constellation size.

FIG. 5 also compares sensitivity of LSD and PSD to the radius of the sphere. When $K_r$ is increased from 4 to 8, there is an increase in the complexity of PSD, but the complexity is limited to the threshold which is defined by the m-algorithm. However, the complexity of LSD increases very fast and without any limitation by increasing the sphere radius.

Figure 6:
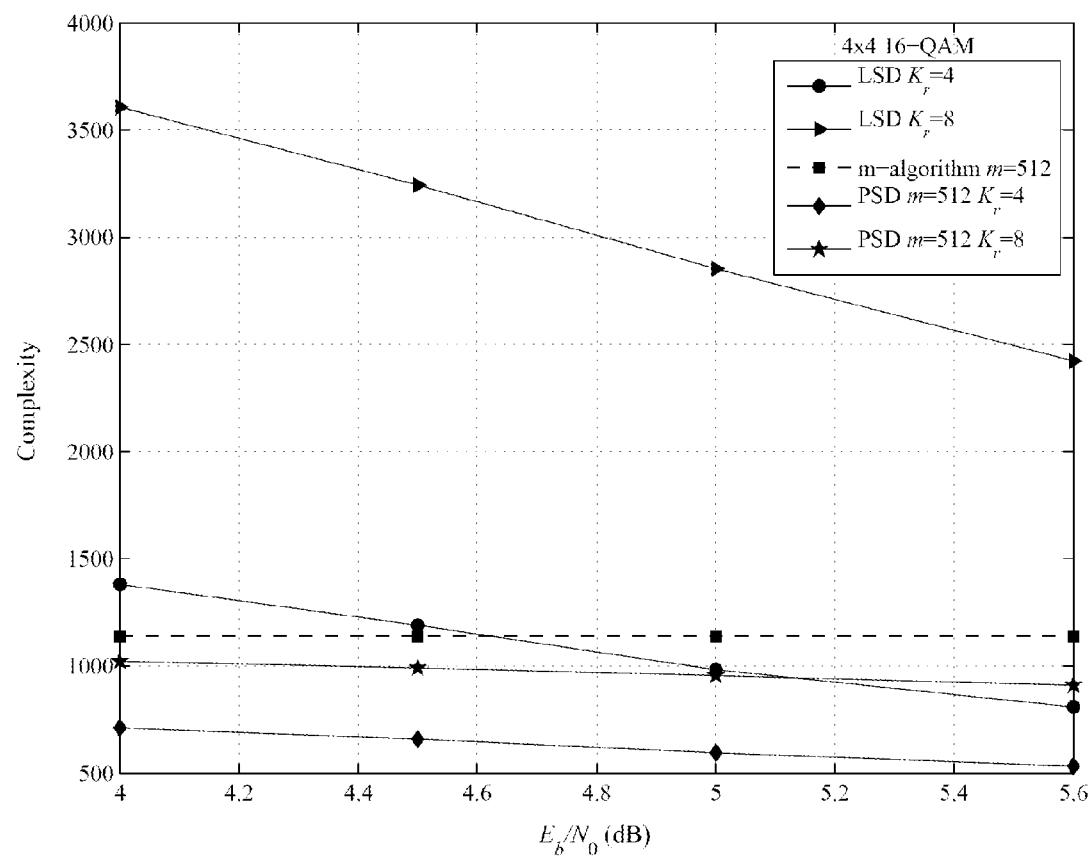
Figure 7:
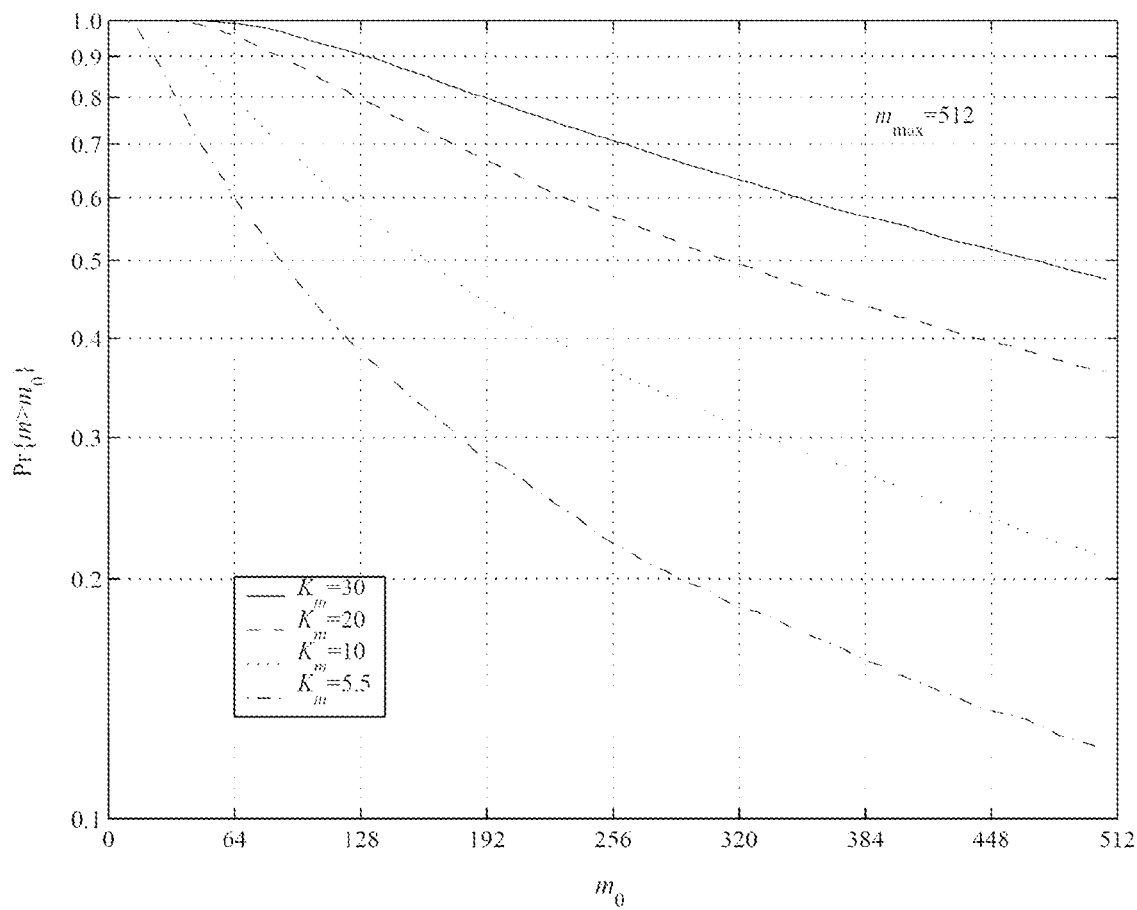

The complexity of the PSD can be reduced further if m is selected adaptively according to Eq. (15). FIG. 6 shows the complementary cumulative distribution function (ccdf) of m for $m_{max}$=512 and different $K_m$ values. With adaptive selection of m, there is no need to set m=512 for all channel conditions. For example, when $K_m$=10, only 36 percent of m's are greater than 256. It means that the average complexity of PSD is less than the case in which m is fixed at 512. This fact is shown in FIG. 7, where the complexities of the PSD detectors are compared for different $K_m$ values. As this figure shows, the complexity of the PSD for the 16-QAM 4×4 MIMO system decreases to the half of the original PSD (with fixed m=512) for $K_m$=5.5.

Figure 8:
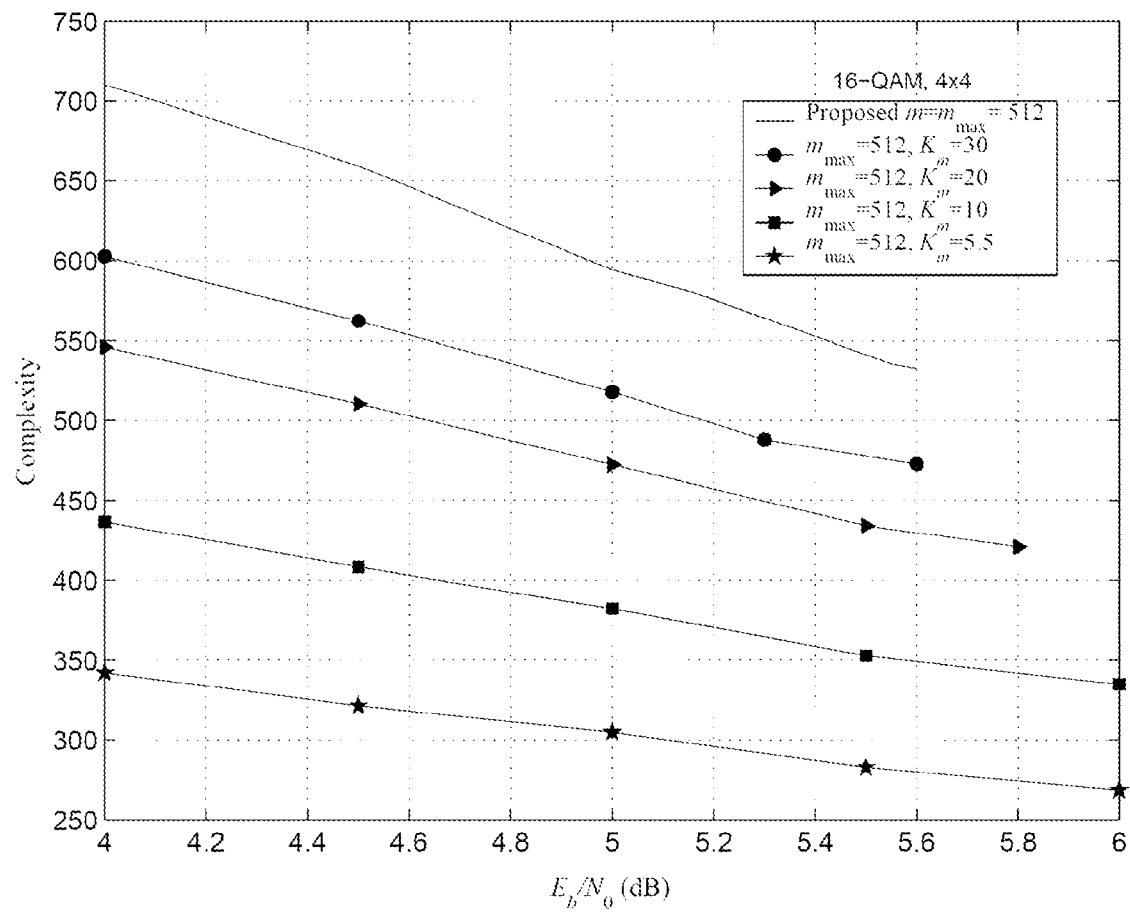

The effect of the adaptive m on the performance of the PSD detector is illustrated in FIG. 8 for 16-QAM 4×4 MIMO system. For $K_m$=5.5, the degradation in performance is less than 0.8 dB. Consequently, with accepting only a small degradation, the complexity of the original PSD can be reduced even further by adaptively selecting m.

Figure 9:
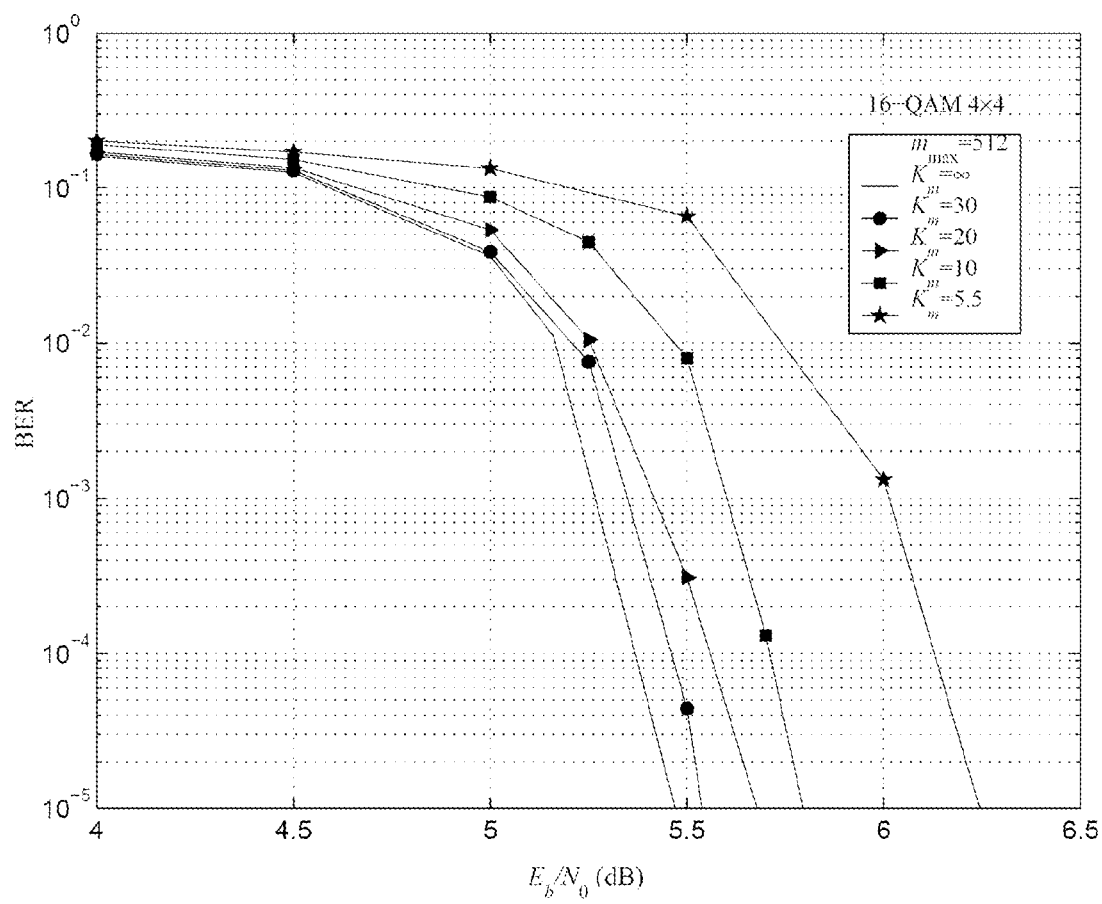

As a practical example, FIG. 9 shows the performance result for a 4×2 space time code of rate 2 adopted in the IEEE 802.16e standard. This space time code could be modeled as Eq. (1) with a 4×4 channel matrix. The performance result of the space time code is compared with a 16-QAM 4×4 MIMO system (rate 4). The complexity results are similar to those noted in FIG. 5.

Accordingly, the soft MIMO detector of the present invention achieves significant complexity gains at similar performance levels as the other competing methods. Both the average complexity and the worst case complexity of the detector are linear. To further decrease the complexity of the detector, detector parameters can be selected adaptively based on the channel condition. In addition, the parallel structure of the method is suitable for hardware parallelization.

The computational complexity of lattice decoding with soft output is significantly reduced using the present method. The present invention can be used in decoding MIMO antenna systems according to various standards, including IEEE 802.16 (WiMAX), spatial multiplexing of users in uplink, multi-user detection, such as in the uplink of any Code Division Multiple Access (CDMA) system.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of detecting and decoding a multiple-input multiple-output (MIMO) signal vector, comprising:
determining, in parallel, soft decision outputs for each symbol in the signal vector in view of a priori soft decoded symbol probabilities by:
generating a tree of lattice points by generating all nodes in a level in parallel by:
applying sphere decoding techniques to determine a radius of a hyper-sphere in accordance with a channel condition;
searching for all lattice points contained within the hyper-sphere to determine the generated nodes; and
determining a branching factor for each generated node; and
retaining a predetermined number of nodes as nodes for a next level of the tree;
receiving soft decoded symbol probabilities determined in accordance with the soft decision outputs; and
iteratively repeating the steps of determining soft decision outputs and receiving soft decoded decision outputs to decode the signal vector.

2. The method of claim 1, further comprising determining a branching metric for a node by adding branch factors of previous nodes leading to a root node.

3. The method of claim 2, wherein retaining only the predetermined number of nodes comprises retaining m nodes having a highest branch metric.

4. The method of claim 3, wherein m is determined adaptively in response to the channel condition.

5. The method of claim 1, wherein the radius is adaptively determined at each level.

6. A MIMO receiver for detecting and decoding a MIMO signal vector, comprising:
an a posteriori probability (APP) detector operable to iteratively determine, in parallel, soft decision outputs for each symbol in the signal vector in view of a priori soft decoded symbol probabilities, the APP detector comprising:
a channel estimator operable to estimate the channel condition;

a parallel sphere decoder operable to determine, in parallel, a set of soft symbol values, and a corresponding branch metric for each soft symbol value, of the signal vector in view of the channel condition and the a priori soft decoded symbol probabilities by generating all nodes in a level in parallel to generate a tree of lattice points, and the parallel sphere decoder having a pruning module operable to prune nodes having the lowest branch metrics at each successive level in the tree; and a log-likelihood ratio processor operable to provide the soft decision outputs in accordance with of the set of soft symbol values and branch metrics;

an error correction code (ECC) decoder operable to iteratively provide soft decoded symbol outputs to the APP detector; and a hard decision processor operable to determine a decoded signal set from the soft decoded symbol outputs after a predetermined number of iterations.

7. The receiver of claim 6, wherein the parallel sphere decoder is operable to determine a radius of a hyper-sphere in accordance with the channel condition.

8. The receiver of claim 7, wherein the parallel sphere decoder is operable to search for all lattice points contained within the hyper-sphere to generate nodes of the tree, and is further operable to determine a branching factor for each determined node.

9. The receiver of claim 8, wherein the parallel sphere decoder is operable to determine a branching metric for a node by adding branching factors of previous nodes leading to a root node.

10. The receiver of claim 6, wherein the pruning module is operable to retain m nodes having a highest branch metric.

11. The receiver of claim 10, wherein the pruning module is further operable to adaptively modify m in response to the channel condition.

12. The receiver of claim 6, wherein the ECC decoder is a turbo decoder.

13. The receiver of claim 6, wherein the ECC decoder is a low-density parity check (LDPC) decoder.

14. The receiver of claim 6, wherein the receiver is compliant with IEEE 802.16 (WiMAX) standards.

15. The receiver of claim 14, wherein the receiver is compliant with the IEEE 802.16e (Mobile WiMAX) standard.

16. A soft MIMO APP detector, comprising:
a channel estimator operable to estimate a channel condition;
a parallel sphere decoder operable to receive a signal vector, and to determine, in parallel, a set of soft symbol values, and a corresponding branch metric for each soft symbol value, of the signal vector in view of the channel condition and a priori soft decoded symbol probabilities by generating all nodes in a level in parallel to generate a tree of lattice points, and having a pruning module operable to prune nodes having the lowest branch metrics at each successive level in the tree; and
a log-likelihood ratio processor operable to provide soft decision outputs in accordance with the set of soft symbol values and branch metrics.

17. The APP detector of claim 16, wherein the parallel sphere decoder is operable to determine a radius of a hyper-sphere in accordance with the channel condition.

18. The APP detector of claim 17, wherein the parallel sphere decoder is operable to search for all lattice points contained within the hyper-sphere to generate nodes of the tree, and to determine a branching factor for each determined node.

19. The APP detector of claim 18, wherein the parallel sphere decoder is operable to determine a branching metric for a node by adding branching factors of previous nodes leading to a root node.

20. The APP detector of claim 16, wherein the pruning module is operable to retain m nodes having a highest branch metric.

21. The APP detector of claim 20, wherein the pruning module is further operable to adaptively modify m in response to the channel condition.

22. A parallel sphere decoder for a soft MIMO APP detector, comprising:
a signal conditioning block operable to condition a MIMO signal vector in accordance with a channel estimation;
a parallel search block operable to receive the conditioned signal vector, and to determine, in parallel, a set of soft symbol values by generating all nodes in a level in parallel to generate a decision tree, and a corresponding branch metric for each soft symbol value, of the signal vector in view of the channel estimation and a priori soft decoded symbol probabilities; and
a pruning block operable to retain a set of m soft symbol values having highest branch metrics at each level of the decision tree by pruning nodes having the lowest branch metrics at each successive level in the tree; and
a log-likelihood ratio processor operable to provide soft decision outputs in accordance with of the set of soft symbol values and branch metrics.

23. The parallel sphere decoder of claim 22, wherein the parallel search block is operable to determine a radius of a hyper-sphere in accordance with the channel estimation.

24. The parallel sphere decoder of claim 23, wherein the parallel search block is operable to search for all lattice points contained within the hyper-sphere to generate nodes of the tree, and to determine a branching factor for each determined node.

25. The parallel sphere decoder of claim 24, wherein the parallel search block is operable to determine the branch metric for a node by adding branching factors of previous nodes leading to a root node.

26. The parallel sphere decoder of claim 22, wherein the pruning block is further operable to adaptively modify m in response to the channel estimation.

27. The parallel sphere decoder of claim 22, wherein the signal conditioning block is further operable to condition the channel estimation.

28. The parallel sphere decoder of claim 27, wherein the signal conditioning block is operable to decompose and triangularize a channel estimation matrix.

29. A method of parallel sphere decoding, comprising:
conditioning a MIMO signal vector in accordance with a channel estimation;
determining, in parallel, a set of soft symbol values, and a corresponding branch metric for each soft symbol value, of the signal vector in view of the channel estimation and a priori soft decoded symbol probabilities by generating all nodes in a level in parallel to generate a decision tree; and
pruning the set of soft symbol values to retain those having the highest branch metrics by pruning away nodes having the lowest branch metrics at each successive level in the decision tree.

30. The method of claim 29, wherein determining the set of soft symbol values comprises determining a radius of a hyper-sphere in accordance with the channel estimation.

31. The method of claim 30, wherein determining the set of soft symbol values comprises searching for all lattice points contained within the hyper-sphere to generate nodes of the tree, and determining a branching factor for each determined node.

32. The method of claim 31, wherein determining the set of soft symbol values comprises determining the branch metric for a node by adding branching factors of previous nodes leading to a root node.

33. The method of claim 29, wherein pruning the set of soft symbol values further comprises adaptively pruning in response to the channel estimation.

34. The method of claim 29, wherein conditioning the MIMO signal vector further comprises conditioning the channel estimation.

35. The method of claim 34, wherein conditioning the MIMO signal vector comprises decomposing and triangularizing a channel estimation matrix.

36. The method of claim 29, further comprising determining a log-likelihood ratio to provide soft decision outputs in accordance with of the set of soft symbol values and branch metrics.

37. A MIMO communication system, comprising:
a transmitter operable to provide an ECC encoded signal block of multiple signals; and
a receiver having an APP detector operable to iteratively determine, in parallel, soft decision outputs for each symbol in the signal vector in view of the priori soft decoded symbol probabilities, the APP detector including:
a channel estimator operable to estimate the channel condition;
a parallel sphere decoder operable to determine, in parallel, a set of soft symbol values, and a corresponding branch metric for each soft symbol value, of the signal vector in view of the channel condition and the a priori soft decoded symbol probabilities by generating all nodes in a level in parallel to generate a tree of lattice points, and the parallel sphere decoder having a pruning module operable to prune nodes having the lowest branch metrics at each successive level in the tree; and
a log-likelihood ratio processor operable to provide the soft decision outputs in accordance with of the set of soft symbol values and branch metrics; and
an ECC decoder operable to iteratively provide soft decoded symbol outputs to the detector; and a hard decision processor operable to determine a decoded signal set from the soft decoded symbol outputs after a predetermined number of iterations.

38. The system of claim 37, wherein the ECC encoded signal block is turbo encoded and the ECC decoder is a turbo decoder.

39. The system of claim 37, wherein the ECC encoded signal block is LDPC encoded, and the ECC decoder is a LDPC decoder.

40. The system of claim 37 employing code division multiple access (CDMA) modulation.

41. The system of claim 37, wherein the receiver and transmitter are compliant with IEEE 802.16 (WiMAX) standards.

42. The system of claim 41, wherein the receiver and transmitter are compliant with the IEEE 802.16e (Mobile WiMAX) standard.

43. A method for performing APP signal detection, comprising:
estimating a channel condition;
decoding symbols of a signal vector, in parallel, to determine a set of soft symbol values, and a corresponding branch metric for each soft symbol value, of the signal vector in view of the channel condition and a priori soft decoded symbol probabilities by generating all nodes in a level in parallel to generate a tree of lattice points, and pruning nodes having the lowest branch metrics at each successive level in the tree; and
providing soft decision outputs in accordance with the set of soft symbol values and branch metrics.

44. The method of claim 43, wherein providing the soft decision outputs comprises determining a log-likelihood ratio.

45. The method of claim 43, wherein decoding symbols of the signal vector further comprises determining a radius of a hyper-sphere in accordance with the channel condition.

46. The method of claim 45, wherein decoding symbols of the signal vector further comprises searching for all lattice points contained within the hyper-sphere to generate nodes of the tree, and determining a branching factor for each determined node.

47. The method of claim 46, wherein decoding symbols of the signal vector further comprises determining a branch metric for a node by adding branching factors of previous nodes leading to a root node.

48. The method of claim 43, wherein pruning the nodes comprises retaining m nodes having a highest branch metric.

49. The method of claim 48, wherein pruning the nodes further comprises adaptively modifying m in response to the channel condition.

* * * * *